(12) United States Patent
Huck

(10) Patent No.: US 6,223,615 B1
(45) Date of Patent: May 1, 2001

(54) ACTUATING ELECTROMOTOR FOR TECHNICAL DEVICES, IN PARTICULAR IN MOTOR VEHICLES

(75) Inventor: Thomas Huck, Schwelm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/367,857

(22) PCT Filed: Dec. 16, 1997

(86) PCT No.: PCT/DE97/02919

§ 371 Date: Aug. 31, 1999

§ 102(e) Date: Aug. 31, 1999

(87) PCT Pub. No.: WO98/58192

PCT Pub. Date: Dec. 23, 1998

(30) Foreign Application Priority Data

Jun. 17, 1997 (DE) .............................................. 197 25 414

(51) Int. Cl.⁷ ........................................................ F16H 1/16
(52) U.S. Cl. .......................... 74/425; 74/427; 403/359.6; 464/89
(58) Field of Search .................... 464/89, 75; 403/359.1, 403/359.6, 372; 74/425, 427, 451

(56) References Cited

U.S. PATENT DOCUMENTS

| | | |
|---|---|---|
| 3,188,124 | 3/1963 | Pestka et al. . |
| 4,075,870 * | 2/1978 | Seifried ................................. 64/9 R |
| 5,564,308 | 10/1996 | Hoshikawa . |
| 5,878,832 * | 3/1999 | Olgren et al. ........................ 180/444 |

FOREIGN PATENT DOCUMENTS

| | | |
|---|---|---|
| 39 32 268 | 6/1990 | (DE) . |
| 58-21060 | 2/1983 | (JP) . |
| 58-99521 | 6/1983 | (JP) . |

* cited by examiner

*Primary Examiner*—David Fenstermacher
(74) *Attorney, Agent, or Firm*—Nixon Peabody LLP; David S. Safran

(57) ABSTRACT

The subject matter of the invention is an electric motor-driven servo-drive for use in technical means, especially motor vehicles, with a small electric drive motor (2) with a motor shaft (4) which is provided with a gear form-fit element (3) at at least one location, proceeding especially from the end, with a worm (5) of a worm gear pair, the worm (5) slipped onto the motor shaft (4), and with a worm wheel (6) of the worm gear pair, the wheel (6) consisting preferably of plastic and coupled to the worm (5) via teeth which engage one another. It is characterized in that the worm (5) consists of plastic, that a driver (7) consisting of a harder material which transfers higher torques than the plastic of the worm (5) is slipped onto the motor shaft (4) and with the corresponding shaft form-fit element engages the gear form-fit element (3) of the motor shaft (4), that the driver (7) on a diameter which is much greater than that of the motor shaft (4) has a worm form-fit element, and that the worm (5) for its part has a driver form-fit element which engages the worm form-fit element of the driver (7).

6 Claims, 1 Drawing Sheet

ACTUATING ELECTROMOTOR FOR TECHNICAL DEVICES, IN PARTICULAR IN MOTOR VEHICLES

BACKGROUND OF THE INVENTION

1. Field of the Invention

The invention relates to an electric motor-driven servo-drive for use in technical means, especially motor vehicles, with a small electric drive motor having a motor shaft, with a worm of a worm gear pair, the worm preferably being made of plastic and slipped onto the motor shaft, with a driver made of a harder material which transfers higher torques than the plastic of the worm on the motor shaft, with a worm wheel of the worm gear pair preferably being made of plastic and coupled to the worm via teeth which engage one another, the driver on a diameter which is much greater than that of the motor shaft having a worm form-fit element and the worm having a driver form-fit element which engages the worm form-fit element of the driver.

2. Description of Related Art

Electric motor-driven servo-drives of this type are being increasingly used in motor vehicles for a host of applications. One special application is servo-drives on motor vehicle door locks in central locking systems (side doors, rear doors, rear hatch). Many other application are known, from the adjustment of headlights through adjustment of sideview mirrors to headrest and seat height adjustments. Electric motor-driven servo-drives of this type are however also used in many other technical means.

The starting point for the invention is an electric motor-driven servo-drive for use in a central locking system of a motor vehicle (published German Patent Application No. 39 32 268), in which a small electric drive motor is mounted on a base plate and has a motor shaft on which a worm is attached. The worm engages the toothed segment of a worm wheel, the two together form a worm gear pair. In this prior art the worm consists of a metal combination, specifically phosphor bronze, while the worm wheel consists of plastic, especially thermoplastic. In this way certain coefficients of friction between the rows of teeth or annular gears which engage one another are achieved.

In the known prior art the electric drive motor is turned off as soon as the swivel element which is driven via the worm gear pair strikes a rubber stop. This so-called blocking mode however entails comparatively high torques to be transmitted during shut-off which can likewise necessitate making the worm from a metal combination, here from phosphor bronze.

While at the high loads to be expected during operation with respect to the torque to be transmitted, worms generally made of metal are used and are pressed onto the smooth or notched motor shaft, at the lower loads to be expected in operation, for reasons of cost, plastic worms are also willingly used and in the same way they are pressed onto the smooth or notched motor shaft or onto the appropriately flattened motor shaft provided with a corresponding flattened area. This simpler and more economical version of an electric motor-driven servo-drive however for a long time has been prohibited where high torques must be transmitted and mainly with frequent occurrence of the aforementioned blocking mode. If for example a plastic worm with the corresponding opposite flattened area is slipped for example on the flattened motor shaft of a small drive motor (the diameter of the motor shaft is roughly 2 mm) this connection is generally unable to transmit higher torques over a longer time or the torques which occur in the blocking mode.

In a completely different specialty, specifically the knobs for radios and other control devices, the problem of overly high Hertzian stress between flattened metal and plastic parts has been known for decades (U.S. Pat. No. 3,188,124 from 1963). The problem is generally solved there by inserting or pushing a metal reinforcing piece (plate) into the plastic part which is made as a sleeve in the area of the flattening. This prevents occurrence of especially dangerous edge stresses on the edges of the flattened area of the plastic material and routes them into the metal plate. This technique which has been known for decades in control knobs has not had any effect on the area of electric motor-driven servo-drives with worm gear pairs.

SUMMARY OF THE INVENTION

The teaching of the invention is thus based on the problem of devising an electric motor-driven servo-drive which economically has a plastic worm, but at the same time can transmit high torques via the worm gear pair and in particular allows permanent blocking operation of the servo-drive.

The aforementioned object is achieved in an electric motor-driven servo-drive with a small electric drive motor having a motor shaft, with a worm of a worm gear pair, the worm preferably being made of plastic and slipped onto the motor shaft, with a driver made of a harder material which transfers higher torques than the plastic of the worm on the motor shaft, with a worm wheel of the worm gear pair preferably being made of plastic and coupled to the worm via teeth which engage one another, the driver on a diameter which is much greater than that of the motor shaft having a worm form-fit element and the worm having a driver form-fit element which engages the worm form-fit element of the driver by a gear form-fit element being provided at at least one location, proceeding especially from the end, by the driver being slipped onto the motor shaft and with the corresponding shaft form-fit element engaging the gear form-fit element of the motor shaft, the gear and shaft form-fit elements which engage one another being made as flattened areas or flat pieces, and by the worm on the end facing the drive motor having a slip-on mount for the ring-shaped driver, the driver being made as a punched part of a metal or a metal combination or a metal alloy, especially brass or bronze.

According to in the invention, the plastic worm is combined with a driver of harder material which transmits higher torques, especially metal or a metal combination. The high surface pressures (Hertzian stresses) on the form-fitting elements of the motor shaft and the driver which engage one another as a result of the small diameter of the motor shaft are reduced to a degree which is feasible for a plastic worm by the form-fitting elements which engage one another occurring between the driver and the plastic worm with a much greater diameter and thus with much larger force transfer surfaces.

As a result, with an economical, small extra part, specifically the driver of harder material, especially metal or a metal combination, cost-saving use of a plastic worm can be enabled. This combination is much more economical than the use of a worm consisting completely of metal, for example phosphor bronze, as in the past.

DETAILED DESCRIPTION OF THE INVENTION

Figure 1:
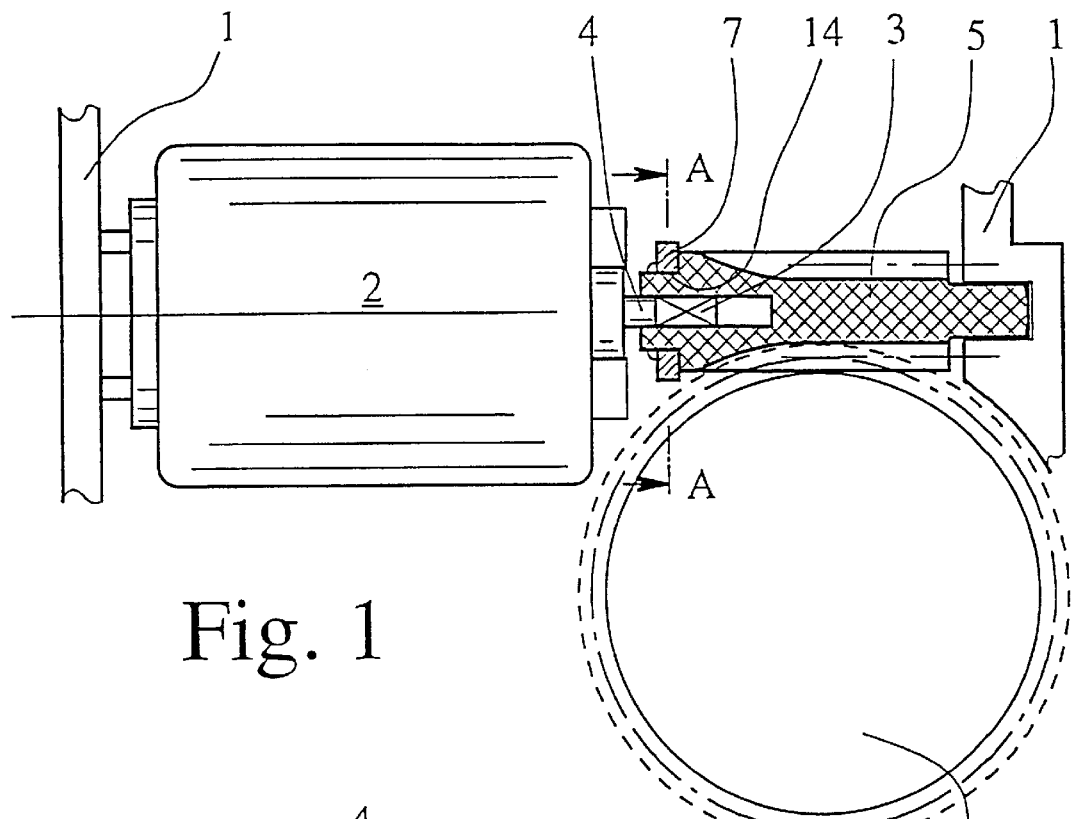
FIG. 1 shows in a schematic view one preferred embodiment of an electric motor-driven servo-drive according to the invention for use in motor vehicles, for example in the central locking system.

FIG. 1 shows a classical arrangement of a electric motor-driven servo-drive for use in motor vehicles, for example in a motor vehicle door lock for the function of a central locking system. The teaching of the invention is not limited to electrical servo-drives for central locking systems, but also relates to electric servo-drives for all types of functions in motor vehicles. In addition, electric motor-driven servo-drives according to the teaching of the invention can be found not only in motor vehicles, but in all technical means where any components must be moved (adjusted) by an electric motor.

The electric motor-driven servo-drive shown in FIG. 1 has, first of all, a support 1 which is only suggested here. A small electric drive motor 2 is mounted on the support 1. The motor has a motor shaft 4 which is provided with a gear form-fit element 3 at at least one location, proceeding especially from the end. A worm 5 of a worm gear pair is slipped onto the motor shaft 4. The worm gear pair furthermore has a worm wheel 6 which is coupled to the worm 5 via teeth which engage one another. For small electric motor-driven servo-drives, the worm wheel 6 generally consists of plastic. But other materials, for example metal, or composite structures, are also conceivable.

According to the teaching of the invention, the worm 5 consists of plastic, preferably thermoplastic. As was explained above, the attainable surface pressures (Hertzian stresses) between the plastic and metal are comparatively small. In order that the plastic worm 5 not wear too quickly even when transferring high torques and especially in the blocking mode, it is provided according to the invention that a driver 7 consisting of a harder material which transfers higher torques than the plastic of the worm 5 is slipped onto the motor shaft 4, and with the corresponding shaft form-fit element 8 engages the gear form-fit element 3 of the motor shaft 4, that the driver 7 on a diameter which is much greater than that of the motor shaft 4 has a worm form-fit element 9 and that the worm 5 for its part has a driver form-fit element 10 which engages the worm form-fit element 9 of the driver 7. The term "slipped" in this connection means not only loose axial slipping-on, but alternatively also slipping-on with considerable expenditure of force until pressed or shrunk on.

Figure 2:
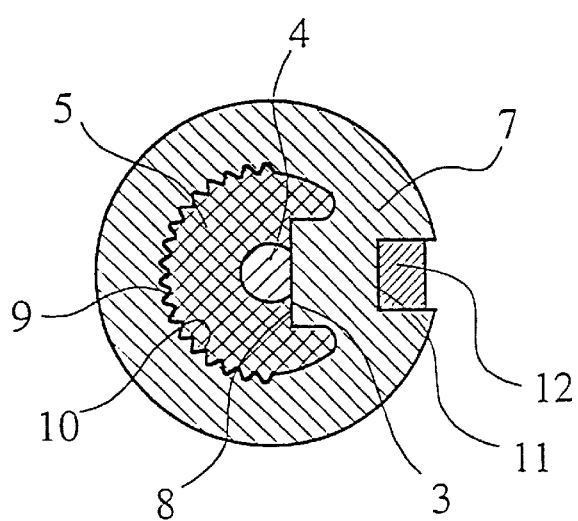
FIG. 2 shows a section along A—A in FIG. 1.

FIG. 2 shows especially well how the teaching is to be understood. The highest surface pressures occur on the gear and shaft form-fit elements 3, 8 which engage one another. Conversely the torque to be transmitted between the worm and driver form-fit elements 9, 10 is distributed over a much larger surface, which as a result of its larger diameter, leads to much lower surface pressures.

In FIG. 2 in conjunction with FIG. 1, is it apparent that in the embodiment shown here the worm and driver form-fit elements 9, 10 which engage one another are made as annular gears or sector gears. Conversely, in the embodiment of FIG. 3, it is provided that these form-fit elements 9, 10 are made as polygons, especially squares (external squares, square sockets).

For the execution of the gear and shaft form-fit elements 3, 8 which engage one another, FIG. 2 shows the execution as a flattened area or flat piece. Here, alternatives as notched teeth or a polygon or the like can also be accomplished.

The embodiment shown in FIG. 2 illustrates another measure which is provided in addition for force transfer from the motor shaft 4 to the driver 7. It can be recognized that the driver 7 has a radial groove 11 into which a driving tang 12, which is connected to the motor shaft 4 or which is molded onto it, fits. In this sense connected means connected by contact of material, therefore, for example, welded. Molded on in one piece means a corresponding molding process. In any case torque which acts on a large diameter on the driver 7 can be transmitted via the interacting driving tang pin 12 and the radial groove 11.

Regardless of the coupling of the driver 7 to the motor shaft 4, it can be recommended that in addition also the worm 5 has a shaft form-fit element which engages the gear form-fit element 3 of the motor shaft 4. This shaft element in FIG. 2 would have the same position as the shaft form-fit element on the driver 7, the two form-fit elements would sit only axially at different locations relative to the motor shaft 4.

It is feasible for bearing in the support 1 that the worm 5 and the driver 7 are axially movable relative to the motor shaft 4. As a result of the directions in which the force acts and of the bearing tolerances there is always a certain relative displacement between the worm wheel 6 and the worm 5 depending on the load direction. So that the drive motor 2 can remain stationary, but nevertheless the worm 5 can execute slight axial relative motion relative to the motor shaft 4, an axial displacement capacity which is also known as such from the prior art is recommended.

Figure 3:
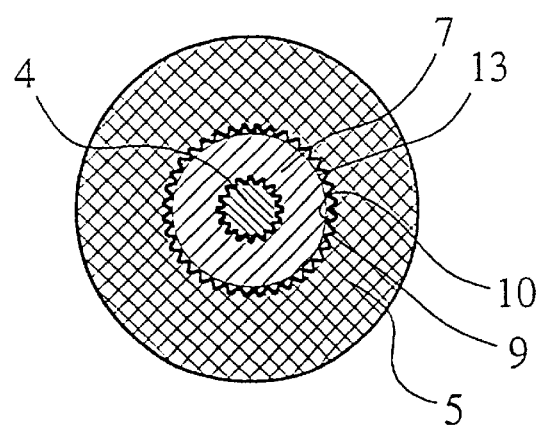
FIG. 3 shows a representation of another embodiment of a electric motor-driven servo-drive according to the invention which corresponds to FIG. 2.

FIG. 3 shows one alternative embodiment which is characterized in that the driver 7 is made as a cylinder body which is inserted into an axially running mount 13 which is essentially cylindrical aside from the driver form-fit element 10 in the worm 5. While in the embodiment shown in FIG. 2 the worm 5 is located radially within the driver 7, the embodiment shown in 10 FIG. 3 shows the reversed arrangement with inside driver 7 and surrounding plastic worm 5.

The embodiment shown in FIG. 2 in conjunction with FIG. 1 shows a driver 7 which Ha has small extension in the axial direction. It is provided that the worm 5 on the end facing the drive motor 2 has a slip-on mount 14 for the generally ring-shaped generally driver 7.

For assembly purposes, the driver 7 in the embodiment shown is slipped onto the slip-on mount 14 of the worm 5 from the end facing the drive motor 2, and thereupon fixed preferably by catching. Fixing can also be done by simple force fit which however may not be as reliable in operation. Of course cementing techniques can also be used.

It is critical for the teaching of the invention that the high surface pressures which are recorded when high torques occur on the motor shaft 4 of small diameter arise solely between metal parts, conversely the force is transferred into the plastic worm 5 over large surfaces and thus with low surface pressures.

In the embodiment from FIG. 2 it can be easily recognized that in this embodiment it is a good idea to injection-mold the driver 7 in an injection molding production process with the material of the plastic worm 5. This yields an intimate connection of the materials via the notched toothing implemented in this example and at the same time good axial fixing.

It has already been explained above which materials for the driver 7 are used with consideration of operating stresses. In particular they include metals or metal combinations or metal alloys, especially of brass or bronze. The driver 7 can be made as a sintered part, injection molded part, punched part, etc.; here, there are many alternative production techniques.

What is claimed is:

1. Electric motor-driven servo-drive comprising a small electric drive motor with a motor shaft, a worm of a worm gear pair, the worm being made of plastic and being slid onto the motor shaft, a driver made of a harder material which transfers higher torques than the plastic of the worm on the motor shaft, a worm wheel of the worm gear pair, the wheel being made of plastic and being coupled to the worm via teeth which engage one another, the driver having a worm form-fit element of a diameter which is much greater than that of the motor shaft and the worm having a driver form-fit element which engages the worm form-fit element of the driver; wherein the motor shaft is provided with a gear-form fit element at at least one location; wherein the driver is slid onto the motor shaft and has a corresponding shaft form-fit element which engages the gear form-fit element of the motor shaft; wherein the gear and shaft form-fit elements which engage one another have flat areas; wherein the worm has a slip-on mount for the driver on an end facing the drive motor; wherein the driver is made of a material selected from the group consisting of a metal, a metal combination or a metal alloy; and wherein the driver is a generally ring-shaped punched part.

2. Servo-drive as claimed in claim 1, wherein the driver has a radial groove into which a driving tang on the motor shaft fits.

3. Servo-drive as claimed in claim 2, wherein the worm and the driver are axially movable relative to the motor shaft.

4. Servo-drive as claimed in claim 2, wherein the driver is fixed on the slip-on mount by catching.

5. Servo-drive as claimed in claim 1, wherein the worm and the driver are axially movable relative to the motor shaft.

6. Servo-drive as claimed in claim 1, wherein the driver is fixed on the slip-on mount by catching.

* * * * *